United States Patent [19]

Endoh

[11] Patent Number: 5,042,037
[45] Date of Patent: Aug. 20, 1991

[54] DIGITAL DATA MODULATION CIRCUIT HAVING A DC COMPONENT SUPPRESSION FUNCTION

[75] Inventor: Naoki Endoh, Yokohama, Japan

[73] Assignee: Kabushiki Kaisha Toshiba, Kawasaki, Japan

[21] Appl. No.: 387,792

[22] Filed: Aug. 1, 1989

[30] Foreign Application Priority Data

Aug. 5, 1988 [JP] Japan .................... 63-194517

[51] Int. Cl.$^5$ .................... H03M 7/00; G06F 11/00
[52] U.S. Cl. .................... 371/57.1; 371/57.2; 341/58; 375/19; 375/34
[58] Field of Search ............. 371/57.1, 57.2; 375/34, 375/19; 341/58

[56] References Cited

U.S. PATENT DOCUMENTS

| | | | |
|---|---|---|---|
| 3,631,471 | 12/1971 | Griffiths | 371/57.2 |
| 3,810,111 | 5/1974 | Patel | 371/57.2 |
| 3,825,892 | 7/1974 | Catchpole | 371/57.2 |
| 3,840,854 | 10/1974 | Franaszek | 371/57.2 |
| 4,309,694 | 1/1982 | Henry | 341/58 |
| 4,414,659 | 11/1983 | Beckers | 371/57.2 |
| 4,456,905 | 6/1984 | Odaka | 341/58 |
| 4,520,346 | 5/1985 | Shimada | 341/58 |
| 4,688,226 | 8/1987 | Burgmeier et al. | 371/57.1 |
| 4,731,797 | 3/1988 | Jaffre et al. | 341/58 |

FOREIGN PATENT DOCUMENTS 0250049  12/1987  European Pat. Off. .
3430836  3/1986  Fed. Rep. of Germany .
2149560  6/1985  United Kingdom .

OTHER PUBLICATIONS

IEEE Transactions on Magnetics, vol. mag-22, No. 5, pp. 1194-1196, S. Fukuda et al; Sep. 1986.
ITEJ Technical Report ICS 81-10, pp. 59-64, "A New DC-Suppressed Channel Coding for DPCM", M. Kashida et al.

Primary Examiner—Charles E. Atkinson
Attorney, Agent, or Firm—Oblon, Spivak, McClelland, Maier & Neustadt

[57] ABSTRACT

In a digital data modulation circuit, a digital data block formed of k words, each of which includes m-bit binary data, is input to an error-correcting coding circuit which adds (n−k) check words to the input data block. The error-correcting coded data block is supplied to an arithmetic operation circuit, which calculates the number of "1" bits and the number of "0" bits to be included in the coded data block output from the error-correcting coding circuit so that the difference between the number of "0" bits and the number of "1" bits included in the coded data blocks which have been output from the error-correcting coding circuit approximates 0 and calculates one control word corresponding to the calculated number. The coded data block output from the error correcting coding circuit is supplied to a modulo-two adder which adds the control word to every word belonging to the coded data block.

10 Claims, 7 Drawing Sheets

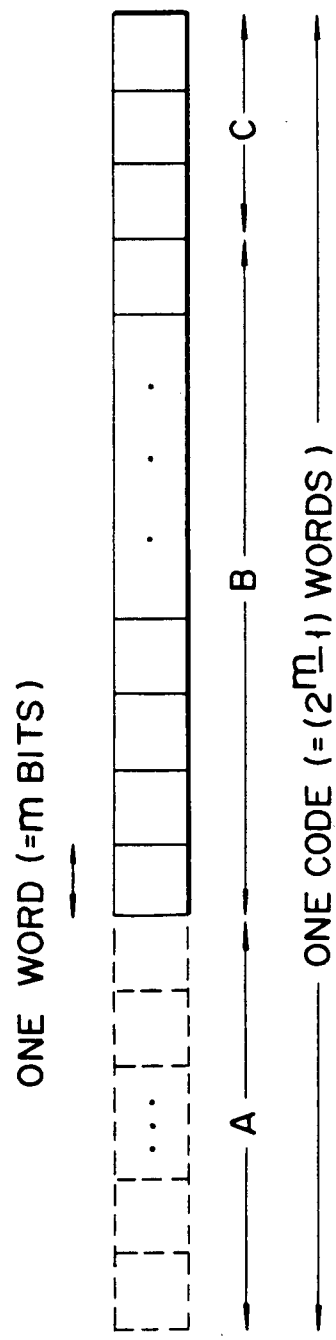
F I G. 1

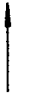
FIG. 5

DIGITAL DATA MODULATION CIRCUIT HAVING A DC COMPONENT SUPPRESSION FUNCTION

BACKGROUND OF THE INVENTION

1. Field of the Invention

The present invention relates to a digital data modulation circuit for converting digital data into a modulated signal before the digital data is recorded in a recording medium having a DC cutoff characteristic or the digital data is transmitted through a transmission path having a DC cutoff characteristic and a digital data demodulation circuit for inversely converting the modulated signal into the original digital data after the digital data is reproduced from the recording medium or the digital data is transmitted through the transmission path.

2. Description of the Related Art

When digital data is recorded in a recording medium such as a magnetic recording medium having a DC cutoff characteristic, in which a DC component cannot be recorded, a DC component is lost upon recording. Therefore, the waveform of the reproduced data does not completely coincide with that of the original data, and a data reproduction error occurs due to the DC component lost upon recording. For this reason, several methods have been proposed or realized in order to suppress a DC component of data to be recorded by performing modulation of the data, thereby reducing such an error.

For example, Japanese Patent Disclosure (Kokai) No. 58-75950 discloses an encoding method for binary data. This method relates to data having a correlation between items of data such as a digital picture signal. In this method, mapping between "0" and "1" bits is improved when n-bit data is converted into n-bit data so that the number of "0" bits becomes substantially equal to that of "1" bits, thereby suppressing a DC component. The most serious problem of this method is that the method cannot be applied to data not having a correlation.

A system such as "8/10 MODULATION CODES FOR DIGITAL MAGNETIC RECORDING" described in IEEE TRANSACTIONS ON MAGNETICS, Vol. MAG-22, No. 5, SEPTEMBER 1986 converts m-bit data into n-bit data (m<n) and suppresses a DC component by utilizing the redundancy of the converted data. This system can suppress a DC component regardless of a statistical property of data such as a correlation. In this system, however, a bit rate of data is undesirably increased after conversion.

In addition, technical report of "The institute of Television Engineers of Japan" ICS81-10 describes "A NEW DC-SUPPRESSED CHANNEL CODING FOR DPCM". This coding system improves mapping by utilizing a distribution and a correlation of differential values when a picture signal is subjected to DPCM and transmitted, thereby suppressing a DC component. This method cannot be applied except for the DPCM.

As described above, according to the conventional techniques, in order to suppress a DC component without increasing a bit rate, a statistical property, i.e., the distribution and the correlation, of data must be predictable and usable. In order to suppress a DC component regardless of a statistical property of data, a bit rate must be increased (normally, about 10% or more). Therefore, operation efficiency of a recording medium or transmission medium is decreased.

In the conventional techniques, therefore, data can be recorded or transmitted after suppressing a DC component without increasing a bit rate only when a statistical property of the data is predictable and a distribution, a correlation, and the like of the data are predetermined. When a statistical property of data is unknown or unusable although it is predictable, a bit rate must be increased by normally about 10% in order to suppress a DC component. For this reason, in order not to decrease recording or transmission efficiency, data to be recorded or transmitted must be strictly limited. As a result, an application range of each of the conventional systems is significantly narrow.

SUMMARY OF THE INVENTION

It is an object of the present invention to provide a digital data modulation circuit having a simple arrangement, which can suppress a DC component while minimizing an increase in bit rate regardless of a statistical property of data.

It is another object of the present invention to provide a digital data demodulation circuit having a simple arrangement, which can demodulate data modulated by the above modulation circuit.

The digital data modulation circuit according to the present invention comprises an error-correcting coding circuit for adding (n−k) check words to an input data block formed of k words each being m-bit binary data, an arithmetic operation circuit for calculating the numbers of "1" bits and "0" bits to be included in the coded data block so that a difference between the number of "0" bits and the number of "1" bits up to the coded data block output from error-correcting coding circuit approximates 0 and calculating one control word corresponding to the calculated numbers of "1" bits and "0" bits, and an adding circuit for adding the control word to the coded data block in modulo-two arithmetic, thereby outputting a modulated and coded data block.

The digital data demodulation circuit according to the present invention comprises a syndrome calculator for calculating a syndrome of a modulated and coded data block, a decoding circuit for detecting, on the basis of the syndrome, a first word error which occurred after the modulated and coded data block is output from the digital data modulation circuit and a second word error at a position l of one modulated and coded data block defined by the following equation:

$$a^l = \sum_{N=0}^{n-1} a^N$$

where $a$ is a primitive element on a galois field GF $(2^m)$ and $2^m - 1 > l \geq n$, and an adder for adding the value of the first error to the word which includes the first error and adding the value of the second error to all the words included in the modulated and coded data block in modulo-two arithmetic.

BRIEF DESCRIPTION OF THE DRAWINGS

FIG. 1 shows a configuration of one code in the multiple compressing Reed-Solomon coding;

FIG. 5 shows a principle of modulation according to the present invention which suppresses a DC component;

DETAILED DESCRIPTION OF THE PREFERRED EMBODIMENTS

An embodiment of a digital data modulation circuit according to the present invention will be described below with reference to the accompanying drawings. Before the circuit is described in detail, its principle will be described. The present invention utilizes an error correcting ability of a multiple compressing error-correcting coding of error-correcting codings. One example of the multiple compressing coding is a multiple compressing Reed-Solomon coding. One code of the multiple compressing Reed-Solomon coding is shown in FIG. 1. One code is formed of $(2^m - 1)$ words, each word formed of m bit-data, and divided into three parts A, B, and C. Part B is formed of information words. Part C is formed of check words for error-correcting. Words included in parts B and C are subjected to be transmission or recording. Part A is formed of redundancy words which are coded as all "0"s and not to be subjected to transmission or recording. These words included in part A are decoded as all "0"s in a demodulation circuit. The multiple compressing Reed-Solomon code is a cyclic code having a primitive element $\alpha$ of the galois field GF $(2^m)$:
where $$G(2^m) = (x - 1)(x - \alpha)(x - \alpha^2) \ldots (x - \alpha^T),$$

T represents the minimum distance.

Here, a code length is represented by $2^m - 1$ and a number of information words is represented by $2^m - T$.

According to the present invention, a control word for suppressing a DC component is included in parts B and C of each code, thereby modulating the data. When the control word is added to all words included in parts B and C of each code in modulo-two arithmetic so that the number of "0" bits in the words in parts B and C becomes equal to that of "1" bits, all words included in parts B and C have errors having the same value. Upon demodulation, this error can be detected, apart from an error occurred during transmission or recording, as an error occurred in a predetermined word included in part A which is not subjected to transmission or recording. Both the errors are corrected upon decoding of the error-correcting code. Therefore, the control words are removed from the demodulated data, and the suppressed DC component is recovered.

Figure 2:
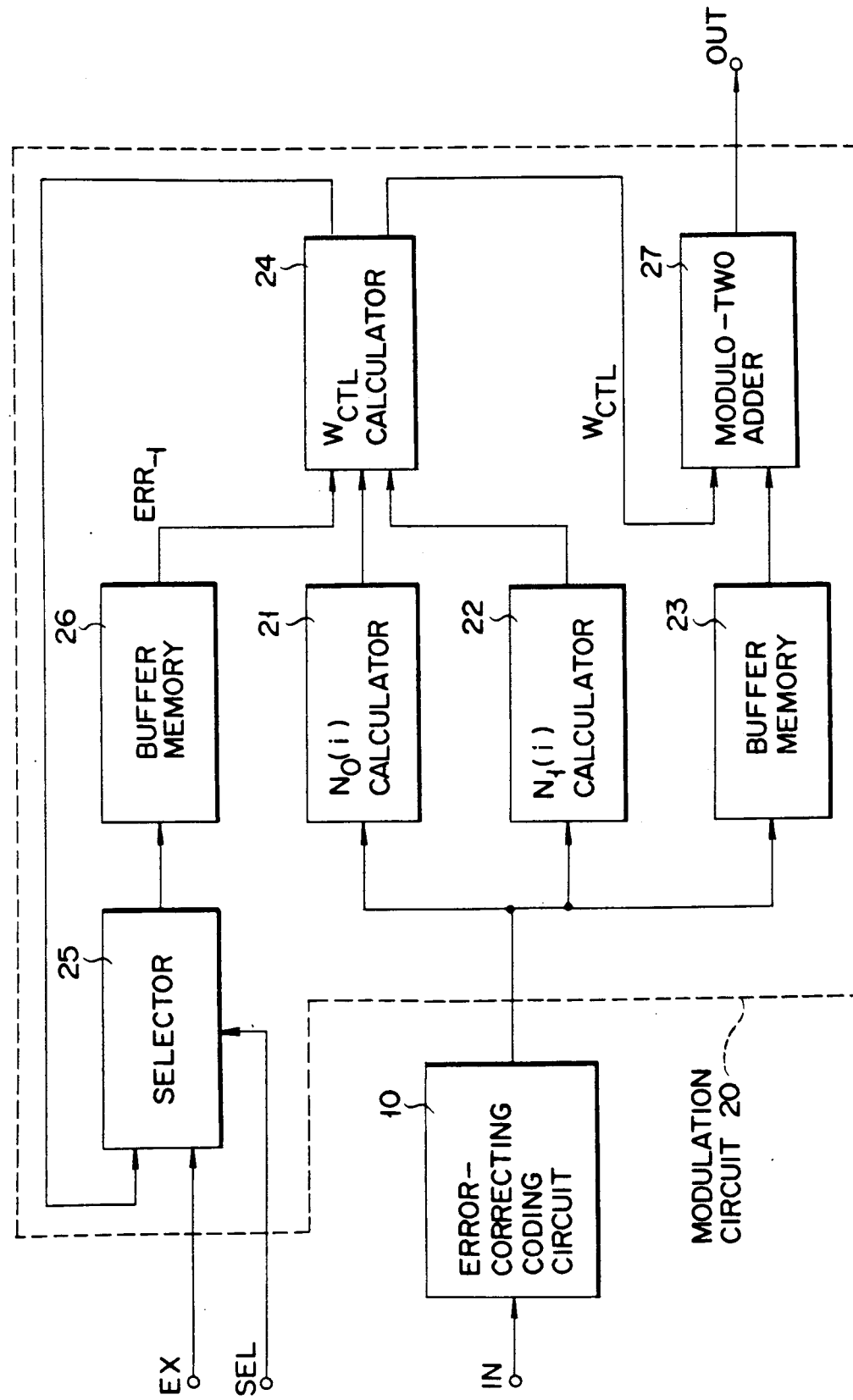
FIG. 2 is a block diagram showing a first embodiment of a digital data modulation circuit according to the present invention.
Figure 3:
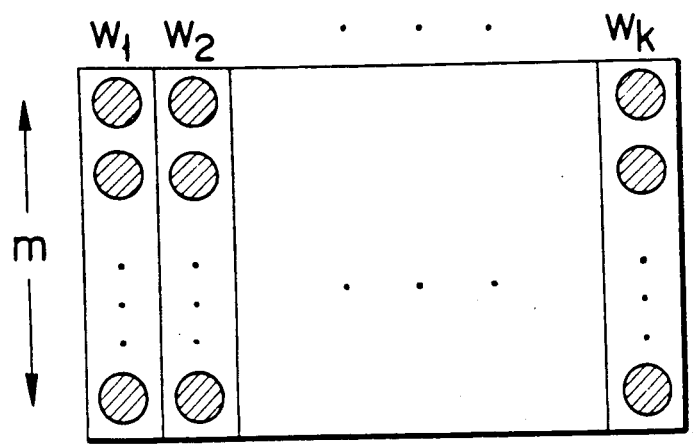
FIG. 3 is a view showing a data block before error-correcting coding of the first embodiment.

FIG. 2 is a block diagram of the modulation circuit of this embodiment. Binary digital data is input to an error-correcting coding circuit 10 via an input terminal IN. In this case, assume that the binary data is divided into m bit $\times$ k bit data block. When the m bit $\times$ k bit data are arranged in a two-dimensional array as shown in FIG. 3 (each hatched circle represents 1-bit data), m-bit data extending along the column direction constitutes one word. Names $W_1, W_2, \ldots W_k$ are given to the respective words from the leftmost word.

Figure 4:
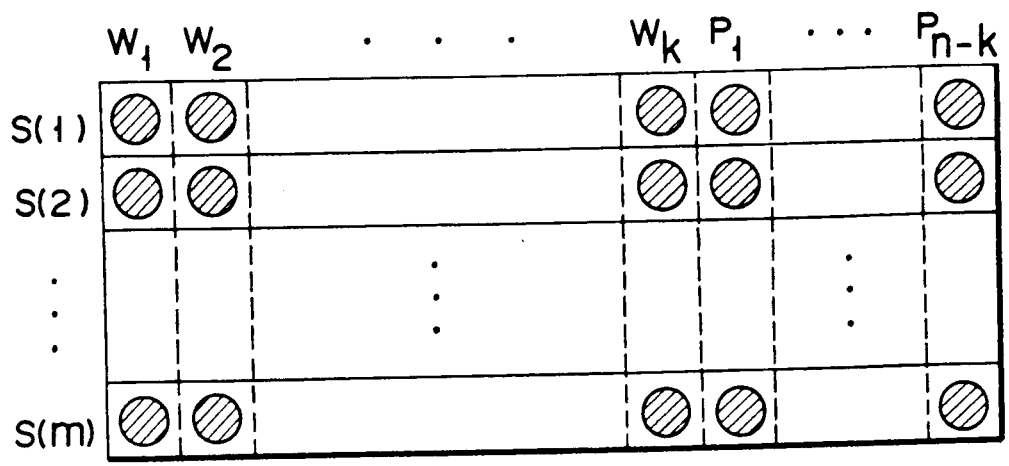
FIG. 4 is a view showing a data block after error-correcting coding.

The error-correcting coding circuit 10 error-correcting codes the input data block in units of m-bit words. In this embodiment, a Reed-Solomon code on a galois field GP $(2^m)$ is used as the error-correcting code. In this case, the circuit 10 adds (n−k) parity check words $p_1, p_2, \ldots p_{n-k}$ to the k words in one data block as shown in FIG. 4, thereby forming one coded data block having n $(=k+n-k)$ words and m bits $\times$ n bits, and outputs the obtained coded data block to a modulation circuit 20 according to the present invention. The check words $p_1, p_2, \ldots p_{n-k}$ are determined to satisfy the following equation (1)*. In equation (1)*, $\alpha$ is a primitive element on the galois field GF $(2^m)$. In this specification, the mark * attached to the equation denote that four fundamental rules of arithmetic operation are defined on the galois field GF $(2^m)$:

$$\begin{pmatrix} 1 & \sim & 1 & 1 \\ \alpha^{n-1} & & \alpha & 1 \\ (\alpha^{n-1})^2 & & \alpha^2 & 1 \\ \cdot & & \cdot & \cdot \\ \cdot & & \cdot & \cdot \\ \cdot & & \cdot & \cdot \\ (\alpha^{n-1})^{n-k-1} & \sim & \alpha^{n-k-1} & 1 \end{pmatrix} \begin{pmatrix} W_1 \\ W_2 \\ \cdot \\ \cdot \\ W_k \\ P_1 \\ P_2 \\ \cdot \\ \cdot \\ \cdot \\ P_{n-k} \end{pmatrix} = \begin{pmatrix} 0 \\ 0 \\ 0 \\ \cdot \\ \cdot \\ \cdot \\ 0 \end{pmatrix} \quad (1)*$$

In FIG. 4, assume that n data aligned in the row direction which have the same bit position are considered as one data set and the respective sets are called S(1), S(2), ... S(m) from the uppermost set. In the modulation circuit 20, the coded data block supplied from the error-correcting coding circuit 10 is supplied to an $N_0(i)$ calculator 21, an $N_1(i)$ calculator 22, and a buffer memory 23. The $N_0(i)$ calculator 21 calculates the number of "0" bits included in the data set S(i) (i=1 to m) and supplies the calculated value $N_0(i)$ to a control word ($W_{CTL}$) calculator 24. The $N_1(i)$ calculator 22 calculates the number of "1" bits in the data set S(i) (i=1 to m) and supplies the calculated value $N_1(i)$ to a $W_{CTL}$ calculator 24. The $W_{CTL}$ calculator 24 also receives error data $ERR_{-1}$ obtained for an immediately preceding coded data block and stored in a buffer memory 26. The error data $ERR_{-1}$ represents a difference (total) of the number of "1" bits and the number of "0" bits up to the immediately preceding coded data block.

The calculator 24 first calculates A represented by equation (2):

$$A = ((n \times m)/2) - ERR_{-1} \quad (2)$$

A represented by equation (2) denotes the number of "1" bits to be included in a current coded data block so that a difference between the number of "1" bits and that of "0" bits up to the correct coded data block becomes 0.

The calculator 24 then calculates $x_i$ (i=1 to m) which minimizes an absolute value $|F|$ of a function F represented by equation (3). Note that each of $x_i$ (i=1 to m) is either 0 or 1:

$$F(x_1, \ldots x_m) = \sum_{i=1}^{m} \{(1 - x_i)N_1(i) + x_i N_0(i)\} - A \quad (3)$$

The first term of the right-hand side of equation (3) represents the number of "1" bits of the coded data block obtained when the $x_i$ is added to a coded data block in modulo-two arithmetic. For this reason, when $x_i$ which minimizes the absolute value $|F|$ of the function F is added to the coded data block in modulo-two arithmetic in order to modulate the coded data block the difference between the number of "1" bits and that of "0" bits up to the current coded data block can be minimized, thereby suppressing a DC component of a modulated and coded data block.

Finally, the $W_{CTL}$ calculator 24 supplies an m-bit CTRL word $W_{CTL}$ constituted by the obtained $x_i$ (i=1 to m) as follows to the first input terminal of modulo-two adder 27.

$$W_{CTL} = \begin{pmatrix} x_1 \\ \cdot \\ \cdot \\ \cdot \\ x_m \end{pmatrix} \quad (4)$$

The calculator 24 supplies the minimum value of the function F to the first input terminal of a selector 25 as the error data $ERR_{-1}$. The second input terminal of the selector 25 receives an initial value of the error data from an external terminal EX. The selector 25 is switched by a control signal SEL. Normally, the error data $ERR_{-1}$ is fed back to the calculator 24 via the buffer memory 26 and referred to upon calculation of a CTRL word $W_{CTL}$ and error data $ERR_{-1}$ for the next data block. Note that the initial value can be supplied to the buffer memory 26 by the control signal SEL in a case other than initialization.

An output from the buffer memory 23 is supplied to the second input terminal of the modulo-two adder 27. The memory 23 is for delaying a signal, and its delay time is set equal to a time required for transmitting a signal from the output terminal of the error-correcting coding circuit 10 to the first input terminal of the adder 27 via the $N_0(i)$ calculator 21, the $N_1(i)$ calculator 22, and the $W_{CTL}$ calculator 24. The calculator 27 adds in units of bits the control word to a coded data block in modulo-two arithmetic operation and outputs the addition result from the output terminal OUT as a modulated and coded data block. The modulo-two addition is an operation for inverting bit data when the control word is "1", and not inverting the bit data when the control word is "0". FIG. 5 shows the modulo-two addition of $W_{CTL}$ to the coded data block. The modulated and coded data block to which the control word is added in modulo-two arithmetic corresponds to a coded data block in which a bit error has already occurred before transmission or recording of the data block which is obtained by the error-correcting coding circuit. As will be described later, however, this error can be detected as an error which occurred in a specific word in the data block upon demodulation and therefore can be corrected by decoding of an error-correcting code similarly to an error which occurred in a transmission or recording of the data block.

Figure 6:
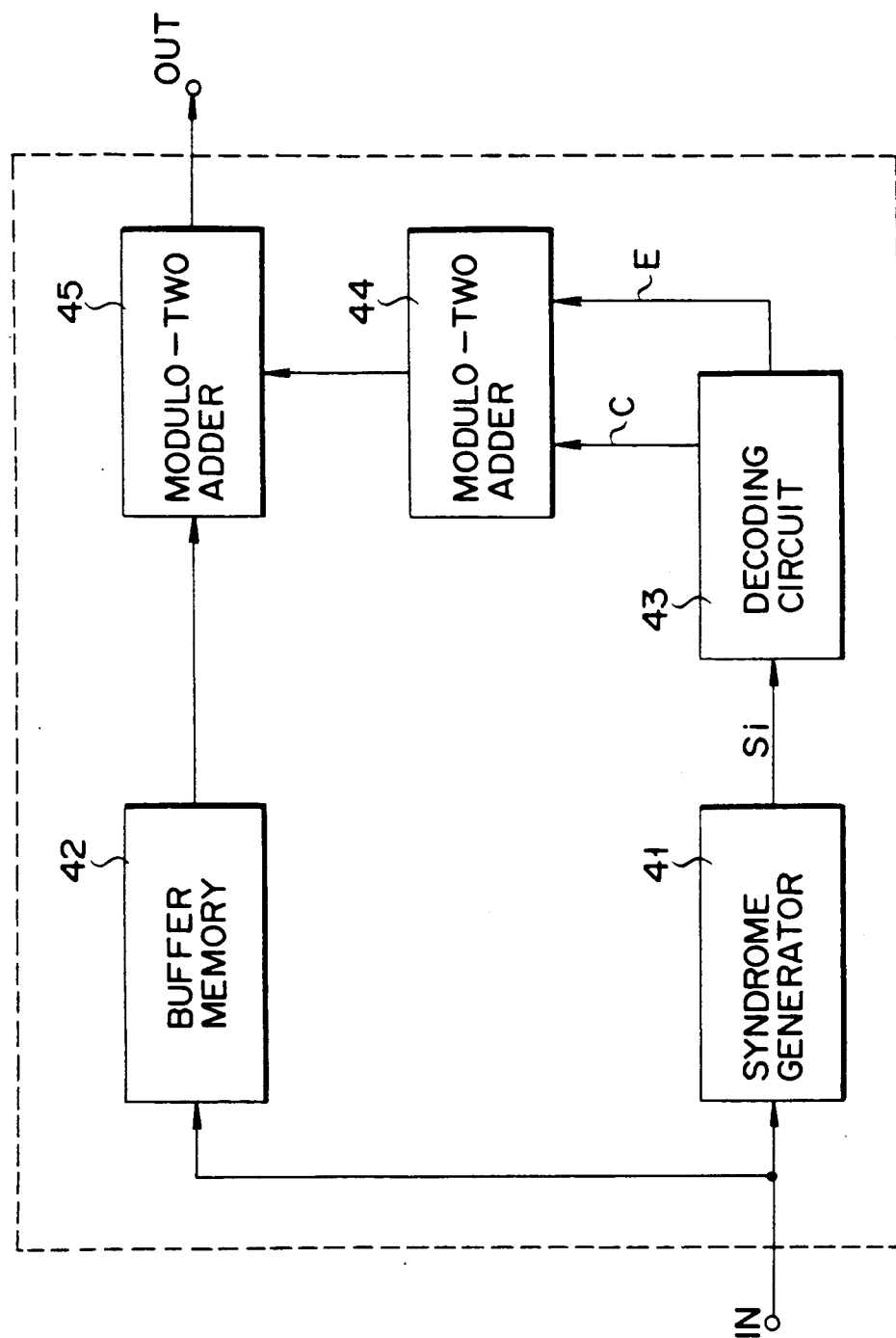
FIG. 6 is a block diagram showing a demodulation circuit for demodulating and decoding data block modulated and coded by the circuit shown in FIG. 2.

FIG. 6 is a block diagram of a demodulation circuit 40 for demodulating and decoding the coded data block modulated by the modulation circuit shown in FIG. 2. The output from the modulation circuit 20 is supplied to an input terminal IN of the demodulation circuit 40 via a recording medium or transmission path (not shown). The input data block is supplied to a syndrome generator 41 and a buffer memory 42. In this case, assuming that the input data block is constituted by words $W_1'$, $W_2'$, ... $W_k'$, $p_1'$, ... $p_{n-k}'$, the generator 41 calculates and supplies a syndrome $S_i$ (i=1 to n−k) of the data block defined by equation (5)* to a decoding circuit 43:

$$\begin{pmatrix} S_1 \\ S_2 \\ S_3 \\ \cdot \\ \cdot \\ \cdot \\ S_{n-k} \end{pmatrix} = \begin{pmatrix} 1 & \sim & 1 & 1 \\ a^{n-1} & \sim & a & 1 \\ (a^{n-1})^2 & & a^2 & 1 \\ \cdot & & \cdot & \cdot \\ \cdot & & \cdot & \cdot \\ \cdot & & \cdot & \cdot \\ (a^{n-1})^{n-k-1} & \sim & a^{n-k} & 1 \end{pmatrix} \begin{pmatrix} W_1' \\ W_2' \\ \cdot \\ \cdot \\ W_k' \\ p_1' \\ p_2' \\ \cdot \\ \cdot \\ \cdot \\ p_{n-k}' \end{pmatrix} \quad (5)$$

Though the syndrome $S_i$ is not limited to the above one, the first matrix in the right-hand term of equation (5)* must be a regular matrix.

An operation of the decoding circuit 43 will be described below by means of arithmetic equations. Assume that the value of the control word $W_{CTL}$ which is added to the output from the error-correcting coding circuit 10 at the modulation circuit is C. Also assume that the number: n−k of parity words is three, and n is an odd number. Since the number of parity words is three, three parameters can be checked, and three paramentes, such as the values and positions of word errors can be detected and corrected.

(i) A case in which the number of word errors which occurred on the transmission path or in the recording-/reproduction system is 0 will be described below. In this case, the syndrome $S_i$ (i=1 to 3) is represented by equation (6)*

$$\begin{aligned} S_1 &= (1 + \ldots + 1 + 1) \cdot C \\ S_2 &= (a^{n-1} + \ldots + a + 1) \cdot C \\ S_3 &= (a^{2(n-1)} + \ldots + a^2 + 1) \cdot C \end{aligned} \quad (6)^*$$

In this case, if the following equation (7)* is satisfied:

$$a^l = \sum_{N=0}^{n-1} a^N \quad (7)^*$$

If $2^m - 1 > l \geq n$, equation (6)* can be rewritten as follows:

$$S_1 = C$$
$$S_2 = \alpha^l \cdot C \qquad (8)^*$$
$$S_3 = \alpha^{2l} \cdot C$$

Therefore, the value of the control word C added as the bit error to each of all the words in one coded data block upon modulation is equal to the syndrome $S_1$ and is expresed as follows:

$$C = S_1 \qquad (9)^*$$

Equation (9)* is obtained on the basis of the assumption that the number of word errors occured during the transmission or recording/reproduction is 0. This assumption can be proved if the following equation which includes a known parameter $\alpha^l$ is satisfied:

$$S_2/S_1 = \alpha^l$$
$$S_3/S_2 = \alpha^l \qquad (10)^*$$

If equation (10)* is not satisfied, it is assumed that at least one word error is occurred during the transmission or recording/reproduction.

(ii) A case in which the number of word errors occurred during the transmission or recording/reproduction is one will be described below. Assuming that an error having value E occurs in the jth word $W_j'$ counted from $W_1'$ of a received data block, the syndrome $S_i'$ (i=1 to 3) is given as the following equation (11) in consideration of equation (8)*:

$$S_1 = C + E$$
$$S_2 = \alpha^l \cdot C + \alpha^{n-j} \cdot E \qquad (11)^*$$
$$S_3 = \alpha^{2l} \cdot C + \alpha^{2(n-j)} \cdot E$$

The following simultaneous equation is obtained from equation (11)*:

$$T_1 = S_2 + \alpha^l . S_1 = (\alpha^{n-j} + \alpha^l) . E$$

$$T_2 = S_3 + \alpha^l . S_2 = \alpha^{n-j} . (\alpha^{n-j} + \alpha^l) . E \qquad (12)$$

The following equation (13)* is obtained by solving equation (12)*:

$$T_2/T_1 = \alpha^{n-j}$$
$$E = T_1/(\alpha^{n-j} + \alpha^l) \qquad (13)^*$$
$$C = S_1 + E$$

The method described in each of the above items (i) and (ii) is an error-correcting method up to one word error and is a known technique. In the present invention, the following relations are satisfied:

$$\alpha^l = \sum_{N=0}^{n-1} \alpha^N \qquad (14)^*$$

$$2^m - 1 > l \geq n \qquad (15)$$

As a result, when an error occurs in the jth word $W_j'$ (j=1 to n) counted from $W_1'$ of the received data block, the following relation is obtained:

$$\alpha^l \neq \alpha^{n-j} \qquad (16)$$

Therefore, as is apparent from the descriptions of the items (i) and (ii), i.e., equations (11)* and (13)*, the error which occurred in the transmission path or in the recording/reproduction system can be clearly distinguished from the control word added to the data block added by the modulation circuit 20.

According to this embodiment, in order to remove the control word from the data block, one-word error correction must be performed upon demodulation (decoding). Therefore, in order to keep an error-detecting-/correcting ability for the word error occurred on the transmission path or in the recording/reduction system, a distance between error-correcting codes to be used must be increased by one. In the case of the Reed-Solomon code, this distance corresponds to one check word and normally leads to only a small increase in redundancy.

In FIG. 6, the decoding circuit 43 supplies the value C of control word to the first input terminal of a modulo-two adder 44 and also supplies the value E of the word error occurred on the transmission path or in the recording/reproduction system to the second input terminal of the adder 44. An output from the adder 44 is supplied to a modulo-two adder 45 and added to a data block delayed by the buffer memory 42 to make synchronization between the output from adder 44 and the data block. Therefore, the adder 45 outputs a data block from which the control word is removed and in which the word error occurred on the transmission path or in the recording/reproduction system is corrected.

In the above embodiment, the Reed-Solomon code is exemplified as the multiple compressing code. However, the present invention can be variously modified and carried out without departing from the spirit and scope of the invention, e.g., another code such as a multiple BCH code can be used. In addition, the demodulation circuit adds the of the two errors to the coded block data in two steps by using the two modulo-two adders. However, only one modulo-two adder (three inputs) may simultaneously add the two errors to the data block. That is, the modulo-two adder 44 may be omitted, and the data block and the two errors C and E may be input to the adder 45.

Figure 7:
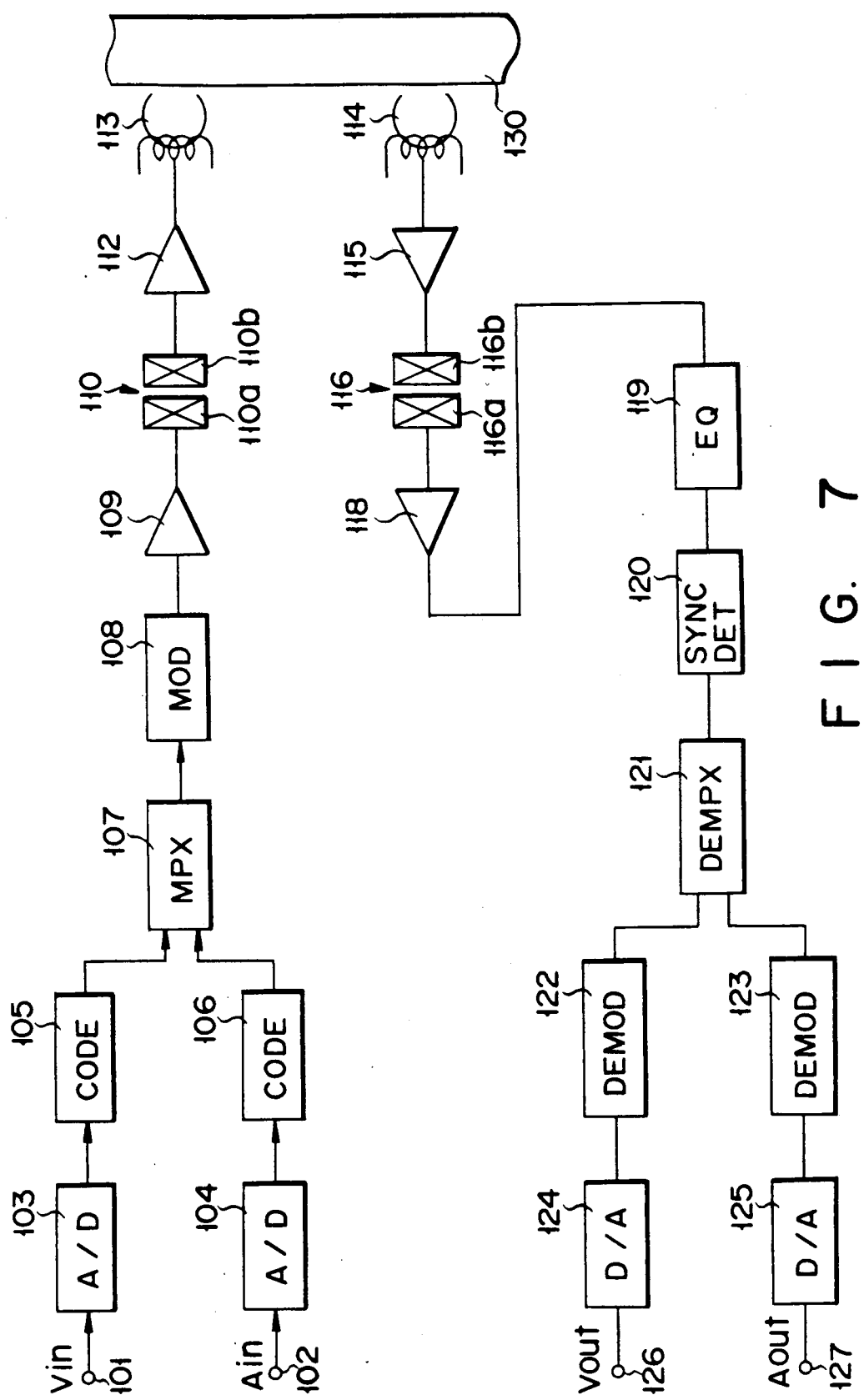
FIG. 7 is a block diagram showing a digital tape recorder as a second embodiment of the present invention.

A digital VTR having the modulation and demodulation circuits according to the present invention will be described below as a second embodiment. FIG. 7 is a block diagram of the digital VTR. A very fine video signal Vin is supplied to an input terminal 101, and an audio signal Ain (8ch) is supplied to an input terminal 102. The input terminals 101 and 102 are connected to error-correcting coding circuits 105 and 106 via A/D converters 103 and 104, respectively. The A/D converter 103 A/D-converts a luminance signal into eight bits at a sampling frequency of 74.25 MHz and A/D-converts each of two color difference signals into eight bits at a sampling frequency of 37.125 MHz. That is, a bit rate of the A/D converter 103 is 1.188 Gb/S including a blanking period. A bit rate of the A/D converter 104 is 48 $kHz \times 8\ ch \times 16\ bits = 6.144\ Mb/S$. The coding circuits 105 and 106 are similar to the error-correcting coding circuit 10 shown in FIG. 2. The circuits 105 and 106 perform not only error-correcting coding but also address (data block address) addition, shuffling, and time base adjustment. Outputs from the coating circuits 105 and 106 are synthesized into a single signal by a multiplexer 107 and supplied to a modulation circuit 108. The circuit 108 is similar to the modulation circuit 20 shown in FIG. 2. However, the circuit 108 also performs addition of a sync signal. An output from the circuit 108 is supplied to a recording head 113 via an amplifier 109, a rotary transformer 110 comprising a stator 110a and a rotor 110b, and a recording amplifier 112. An audio data, an error-correcting check word, a sync code address, an edit gap, and the like which are recorded by the head 113 are inserted into a blanking period. A recording bit rate is 1.188 $Gb/S/8$ ch = 148.5 $Mb/S$.

Figure 8:
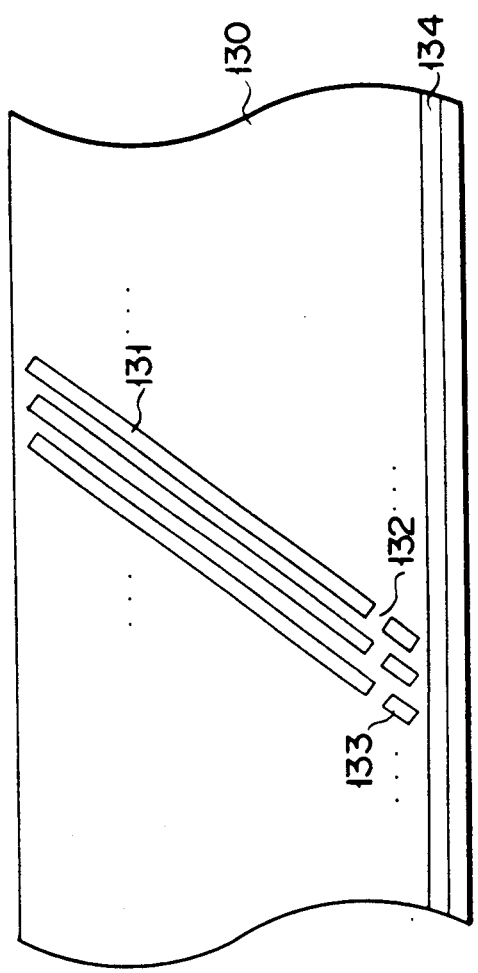
FIG. 8 is a view showing a recording format of the tape recorder shown in FIG. 6.

FIG. 8 shows a signal format on a magnetic tape 130. A control track 134 is formed on one side portion of the magnetic tape 130 along its running direction, and a plurality of video tracks 131 and audio tracks 133 are formed parallel to each other and obliquely to the control track 134. An edit gap 132 is formed between each video track 131 and the audio track 133.

Referring back to FIG. 7, an output from a reproduction head 114 is supplied to an equalizer 119 via a reproduction amplifier 115, a rotary transformer 116 comprising a stator 116a and a rotor 116b, and an amplifier 118. The equalizer 119 includes a clock extraction circuit. An output from the equalizer 119 is supplied to a demultiplexer 121 via a sync detecting/protecting circuit 120 and separated into a video signal and an audio signal. The video signal is supplied to a demodulation circuit 122 similar to the demodulation circuit 40 shown in FIG. 6 to perform error-correcting decoding, demodulating, deshuffling, and time base adjustment. An output from the demodulation circuit 122 is supplied to a very fine video signal output terminal 126 via a D/A converter 124. The audio signal is also supplied to a demodulation circuit 123 similar to the demodulation circuit 40 shown in FIG. 6 to perform error-correcting coding, demodulating, deshuffling, and time base adjustment. An output from the demodulation circuit 123 is supplied to an audio signal (8 ch) output terminal 127 via a D/A converter 125.

In this manner, when digital data is to be recorded on a magnetic tape having DC cutoff characteristics, a DC component can be suppressed to decrease an error rate of reproduced data.

As has been described above, according to the present invention, the control word is modulo-two added to a coded data block to sufficiently decrease a difference between the number of "0" bits and that of "1" bits up to the current data block, thereby performing data modulation while suppressing a DC component. In addition, the modulo-two added control word can be obtained as a error occurring at a specific word except for a data word and a check word upon demodulation. Therefore, in order to suppress a DC component while maintaining a detecting/correcting ability for an error occurred on a transmission path or recording/reproduction system, a distance between error-correcting codes to be used need only be increased by one. In the case of the Reed-Solomon code, for example, this corresponds to increasing a parity word by one. Therefore, while an increase in bit rate is minimized, an efficient DC component suppressing effect not depending on a property of data can be obtained.

What is claimed is:

1. A digital data modulation circuit comprising:
   coding means for adding (n−k) check words to an input data block formed of k words each including m-bit binary data, thereby error-correcting coding the input data block;
   arithmetic operation means, connected to said coding means, for calculating the numbers of "1" bits and "0" bits to be included in the coded data block output from said coding means so that a difference between the number of "0" bits and the number of "1" bits included in the coded data blocks which have been output from said coding means approximates 0, and for calculating one control word corresponding to the calculated number; and
   modulo-two adding means, connected to said coding means and arithmetic operation means, for adding the control word to each of all words belonging to the coded data block output from said coding means in modulo-two arithmetic.

2. The circuit according to claim 1, in which said arithmetic operation means comprises:
   first means for calculating the number $N_0(i)$ (i = 1 to m) of "1" bits and the number $N_1(i)$ (i = 1 to m) of "1" bits included in the ith (i = 1 to m) bit of each word belonging to the coded data block output from said coding means; and
   second means for calculating a control word and error data of the coded data block in accordance with $N_0(i)$ and $N_1(i)$ and error data representing a difference between the number of "0" bits and the number of "1" bits up to an immediately preceding coded data block.

3. The circuit according to claim 2, in which said second means comprises:
   means for calculating error data $ERR_{-1}$ representing a difference between the number of "1" bits and the number of "0" bits up to the immediately preceding coded data block;
   means for calculating the following A:

$$A = ((n \times m)/2) - ERR_{-1};$$

and
   means for calculating a control word formed of $x_i$ (i = 1 to m) (note that each $x_i$ (i = 1 to m) is 0 or 1) which minimizes an absolute value $|F(x_1, \ldots, x_m)|$ of the following function $F(x_1, \ldots, x_m)$:

$$F(x_1, \ldots x_m) = \sum_{i=1}^{m} \{(1 - x_i)N_1(i) + x_iN_0(i)\} - A.$$

4. The circuit according to claim 2, in which said second means comprises:
   means for calculating error data $ERR_{-1}$ representing a difference between the number of "1" bits and the number of "0" bits up to the coded data block;
   a selector for selecting the error data or predetermined initial value data; and
   a buffer memory for holding an output from said selector until the next coded data block is input.

5. The circuit according to claim 1, in which said coding means codes the input data block on the basis of a multiple Reed-Solomon coding.

6. The circuit according to claim 1, further comprising means for recording an output from said modulo-two adding means on a magnetic recording medium.

7. A digital data demodulation circuit for decoding modulated and coded data block to which a predetermined control word is added in modulo-two arithmetic, comprising:

means for generating a syndrome of the modulated and coded data block;

decoding means for calculating, on the basis of the syndrome, a first word error which occurred after modulation and coding of data block and a second word error at a position l of one data block defined by the following equation:

$$\alpha^l = \sum_{N=0}^{n-1} \alpha^N$$

where $\alpha$ is a primitive element on a galois field GF($2^m$) and $2^m 1 > 1 \geq n$; and means for adding the value of the first word error to the word which includes the first word error and adding the value of the second word error to all the words included in the coded data block in modulo-two arithmetic.

8. A method for modulating a digital coded data block which is obtained by adding (n−k) check words to an input data block formed of k words each being m-bit binary data, comprising the steps of:

calculating a control word on the basis of the numbers of "1" bits and "0" bits included in the coded data block; and adding the control word to the coded data block in modulo-two arithmetic.

9. The method according to claim 8, in which said calculating step comprises:

a first step for calculating the number $N_0(i)$ (i=1 to m) of "0" bits and the number $N_1(i)$ (i=1 to m) of "1" bits included in the ith (i=1 to m) bit of each word belonged to the coded data block; and a second step for calculating a control word and error data of the coded data block in accordance with $N_0(i)$ and $N_1(i)$ and error data representing a difference between the number of "0" bits and the number of "1" bits up to an immediately preceding coded data block.

10. The method according to claim 8, in which said second step comprises the steps of:

calculating error data $ERR_{-1}$ representing a difference between the number of "1" bits and the number of "0" bits up to the immediately preceding coded data block.

* * * * *